United States Patent
Kim et al.

[19]

[11] Patent Number: 6,073,026
[45] Date of Patent: Jun. 6, 2000

[54] METHOD AND DEVICE FOR TESTING LINK POWER CONTROL ON MOBILE COMMUNICATIONS SYSTEM

[75] Inventors: Jin Hyun Kim, Kyoungki-do; Jae Kyung Kim, Taegu-si, both of Rep. of Korea

[73] Assignee: Hyundai Electronics Ind. Co., Ltd., Kyoungki-do, Rep. of Korea

[21] Appl. No.: 08/969,502

[22] Filed: Nov. 13, 1997

[30] Foreign Application Priority Data

Dec. 2, 1996 [KR] Rep. of Korea ............... 96-60993

[51] Int. Cl.$^7$ .................................................. H04B 7/00
[52] U.S. Cl. .................... 455/522; 455/424; 455/67.1; 455/69
[58] Field of Search .................... 455/67.1, 522–528, 455/69, 70, 115, 88, 38.3, 67.3, 226.2, 226.3, 437; 370/335, 318; 375/213, 220, 224; 379/59

[56] References Cited

U.S. PATENT DOCUMENTS

| | | | |
|---|---|---|---|
| 5,241,690 | 8/1993 | Larsson et al. | 455/54.1 |
| 5,357,513 | 10/1994 | Kay et al. | 370/95.3 |
| 5,461,639 | 10/1995 | Wheatley, III et al. | 375/205 |
| 5,465,393 | 11/1995 | Frostrom et al. | 455/54.1 |
| 5,574,984 | 11/1996 | Reed et al. | 455/69 |
| 5,603,096 | 2/1997 | Gilhousen et al. | 455/69 |
| 5,812,938 | 9/1998 | Gilhousen et al. | 455/69 |
| 5,982,760 | 11/1999 | Chen | 370/335 |

*Primary Examiner*—Daniel S. Hunter
*Assistant Examiner*—Charles Chow
*Attorney, Agent, or Firm*—McAulay Nissen Goldberg & Kiel, LLP

[57] ABSTRACT

A device for testing the link power control in a mobile communications system includes: a first device including an attenuator whose attenuation factor is controllable; a base station transmitting data through the attenuator; a mobile receiving the data transmitted from the base station through the attenuator; a first cable for connecting the transmission terminal of the base station to the input terminal of the attenuator; a second cable for connecting the output terminal of the attenuator to the reception terminal of the mobile; and a third cable for connecting the reception terminal of the base station to the transmission terminal of the mobile, the first device being for testing the forward link power control; and a second device including an attenuator whose attenuation factor is controllable; a mobile transmitting data through the attenuator; a base station receiving the data transmitted from the mobile through the attenuator; a fourth cable for connecting the transmission terminal of the mobile to the input terminal of the attenuator; a fifth cable for connecting the output terminal of the attenuator to the reception terminal of the base station; and a sixth cable for connecting the transmission terminal of the base station to the reception terminal of the mobile, the second device being for testing the reverse link power control.

4 Claims, 4 Drawing Sheets

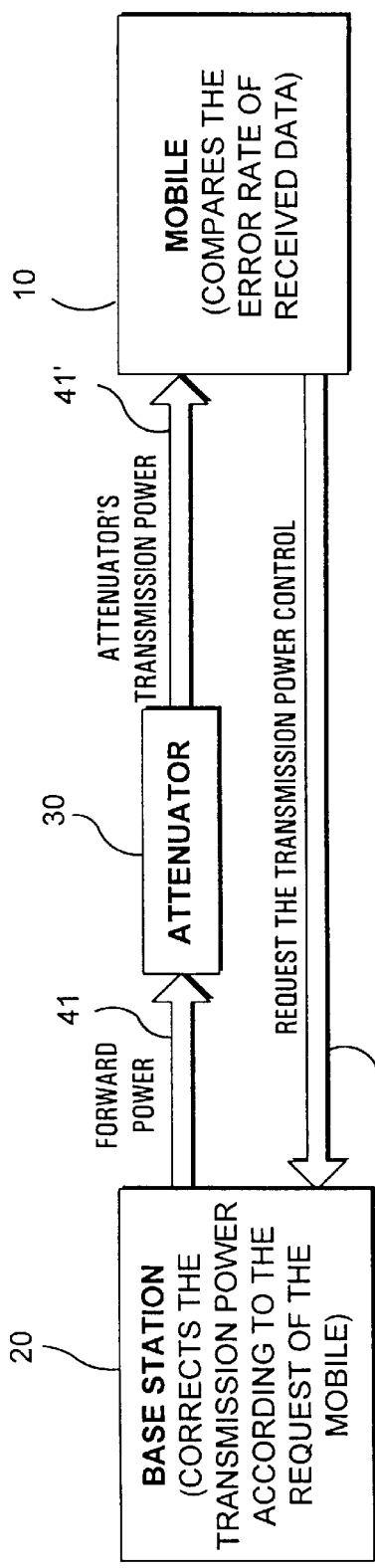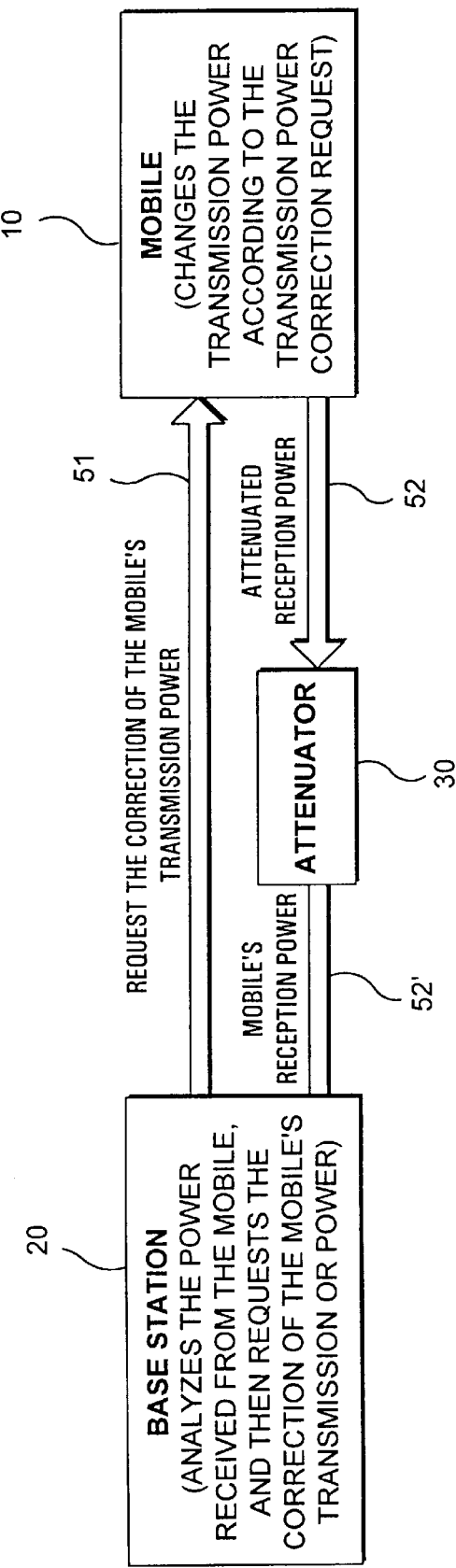

METHOD AND DEVICE FOR TESTING LINK POWER CONTROL ON MOBILE COMMUNICATIONS SYSTEM

BACKGROUND OF THE INVENTION

1. Field of the Invention

The present invention relates to the control of the link power in a mobile communications system, specifically, to a method and device for testing the link power control in a mobile communications system, which is able to test the transmission/reception power control between a base station and mobile even in a laboratory.

2. Discussion of Related Art

In a mobile communications system, when a transmitter transmits a radio wave, the radio wave passes through various transmission paths of air, ionosphere and the surface of the earth, and then it is received by a receiver. The reception sensitivity is, generally, in inverse proportion to four squares of the distance between the transmitter and receiver. Thus, when the distance between a transmitter and receiver A is 1 Km, and the distance between the transmitter and receiver B is 2 Km, the difference in the reception sensitivity between receivers A and B is 1/16.

Mobile units communicating with a base station perform the power control, to solve Near-Far problem. In order to remove the difference in the reception sensitivity according to the distance between the transmitter and receiver in the mobile communications system, the base station and mobile have the power control inducing function which controls the transmission/reception power to make the normal call possible when the normal call on the forward link and reverse link on the talking path becomes difficult after the call is set, due to various surrounding effects.

In a prior art, to test the normal operation state of the power control inducing function, the mobile is moved farthest in the region of the base station, and the received power of the mobile is checked as shown in FIG. 1. When the transmission/reception power control is required since the distance between the base station and mobile is changed, the contents of the communication between the mobile and base station are actually analyzed in the field, so as to produce the error rate of received data.

A conventional forward link power controlling method is disclosed in U.S. Pat. No. 5,461,639, in which a mobile periodically requests a base station to change the output power, and the base station sends a frame to the mobile at a specific rate. If the mobile receives the frame correctly, it sets a power control bit in the next frame to be transmitted to the base station. Based on the error rate of the received power control bits, the base station determines whether to increase or decrease the transmission power.

In the conventional method, the mobiles are tested outside the laboratory when the test of the power control inducing function of the mobile communications system is required. Accordingly, expensive and heavy testing devices and their operators should moved with the mobile. This deteriorates the efficiency in the testing operation, and costs much.

SUMMARY OF THE INVENTION

Accordingly, the present invention is directed to a method and device for testing the link power control in a mobile communications system that substantially obviates one or more of the problems due to limitations and disadvantages of the related art.

An object of the present invention is to provide a method and device for testing the link power control in a mobile communications system, in which an attenuator replaces a radio path between a base station and mobile, to allow the test for the mobile to be carried out in a laboratory, and to obtain the same result that an actual field test produces.

Another object of the present invention is to provide a method and device for testing the link power control in a mobile communications system, in which the power control function of the mobile communications system can be easily tested in a laboratory.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the device for testing the link power control in a mobile communications system, includes: a first device including an attenuator whose attenuation factor is controllable; a base station transmitting data through the attenuator; a mobile receiving the data transmitted from the base station through the attenuator; a first cable for connecting the transmission terminal of the base station to the input terminal of the attenuator; a second cable for connecting the output terminal of the attenuator to the reception terminal of the mobile; and a third cable for connecting the reception terminal of the base station to the transmission terminal of the mobile, the first device being for testing the forward link power control; and a second device including an attenuator whose attenuation factor is controllable; a mobile transmitting data through the attenuator; a base station receiving the data transmitted from the mobile through the attenuator; a fourth cable for connecting the transmission terminal of the mobile to the input terminal of the attenuator; a fifth cable for connecting the output terminal of the attenuator to the reception terminal of the base station; and a sixth cable for connecting the transmission terminal of the base station to the reception terminal of the mobile, the second device being for testing the reverse link power control.

To accomplish the objects of the present invention, there is also provided a method of testing the link power control in a mobile communications system, including the steps of: controlling the forward link power; and controlling the reverse link power, wherein the step of controlling the forward link power includes the substeps of: inserting an attenuator between the transmission terminal of a base station and the reception terminal of a mobile, connecting the reception terminal of the base station to the transmission terminal of the mobile using a cable, and attenuating a transmission signal, to allow the attenuator and cable to replace a radio transmission/reception path; transmitting information about a reception power and reception data's error received by the mobile to the base station, according to the variation in the attenuation factor of the attenuator; and the base station receiving the reception power and error rate received by the mobile, comparing them with a critical value, and controlling its transmission power based on the compared result, the step of controlling the reverse link power including the substeps of: inserting an attenuator between the transmission terminal of a mobile and the reception terminal of a base station, connecting the reception terminal of the mobile to the transmission terminal of the base station using a cable, and attenuating a transmission signal to allow the attenuator and cable to replace the radio transmission/ reception path; the base station calculating the reception power and reception data's error rate according to the variation in the attenuation factor of the attenuator, comparing them with a critical value, and transmitting a message requesting the mobile to correct its transmission power to the mobile based on the compared result to the mobile; and the mobile receiving the transmission power correction request message, correcting its transmission power, and performing transmission operation.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the invention:

In the drawings:

FIG. 2A is a block diagram of a hardware for testing the forward link power control function according to the present invention; and FIG. 2B is a block diagram of a hardware for testing the reverse link power control function according to the present invention;

DETAILED DESCRIPTION OF PREFERRED EMBODIMENT

Figure 1:
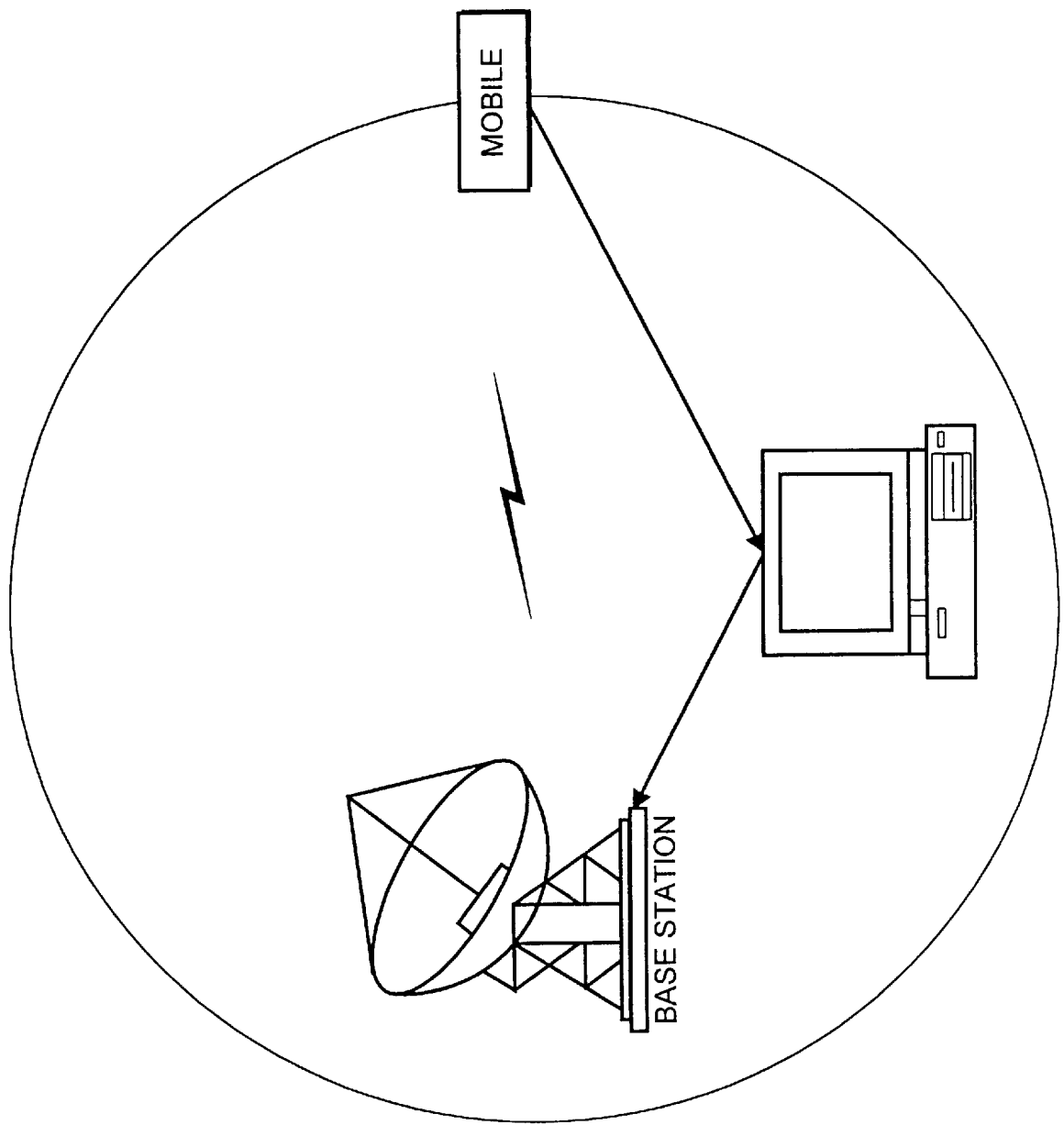
FIG. 1 shows a conventional method of testing the power control between a base station and mobile.

Reference will now be made in detail to the preferred embodiments of the present invention, examples of which are illustrated in the accompanying drawings. p FIG. 2A is a block diagram of a hardware for testing the forward link power control function according to the present invention. Referring to FIG. 2A, an attenuator 30 is set between the transmission terminal of a base station 20 and reception terminal of a mobile 10 using transmission cables 41 and 41'. Attenuator 30 may be a variable attenuator whose attenuation factor is controllable. A reception cable 42 where there is no loss is connected between the transmission terminal of mobile 10 and reception terminal of base station 20. It is possible to connect the cables and attenuator between the transmission terminal of mobile 10 and reception terminal of base station 20, and to set the attenuator's attenuation factor to 0, to easily test the reverse link power control function.

As described above, attenuator 30 is inserted between the transmission terminal of base station 20 and reception terminal of mobile 10, and reception cable 42 connects the reception terminal of base station 20 to the transmission terminal of mobile 10, to thereby allow the attenuator and cable to replace the radio transmission/reception path between the base station and mobile. A signal is transmitted from base station 20 to mobile 10 by varying the attenuation factor of attenuator 30. Based on the variation in the level of a received signal, mobile 10 transmits information about a received power and received data's error rate to base station 20. Base station 20 receives the error rate, compares it with a critical value, and controls its transmission power according to the compared result. The forward link power control is carried out in the aforementioned manner.

Figure 3A:
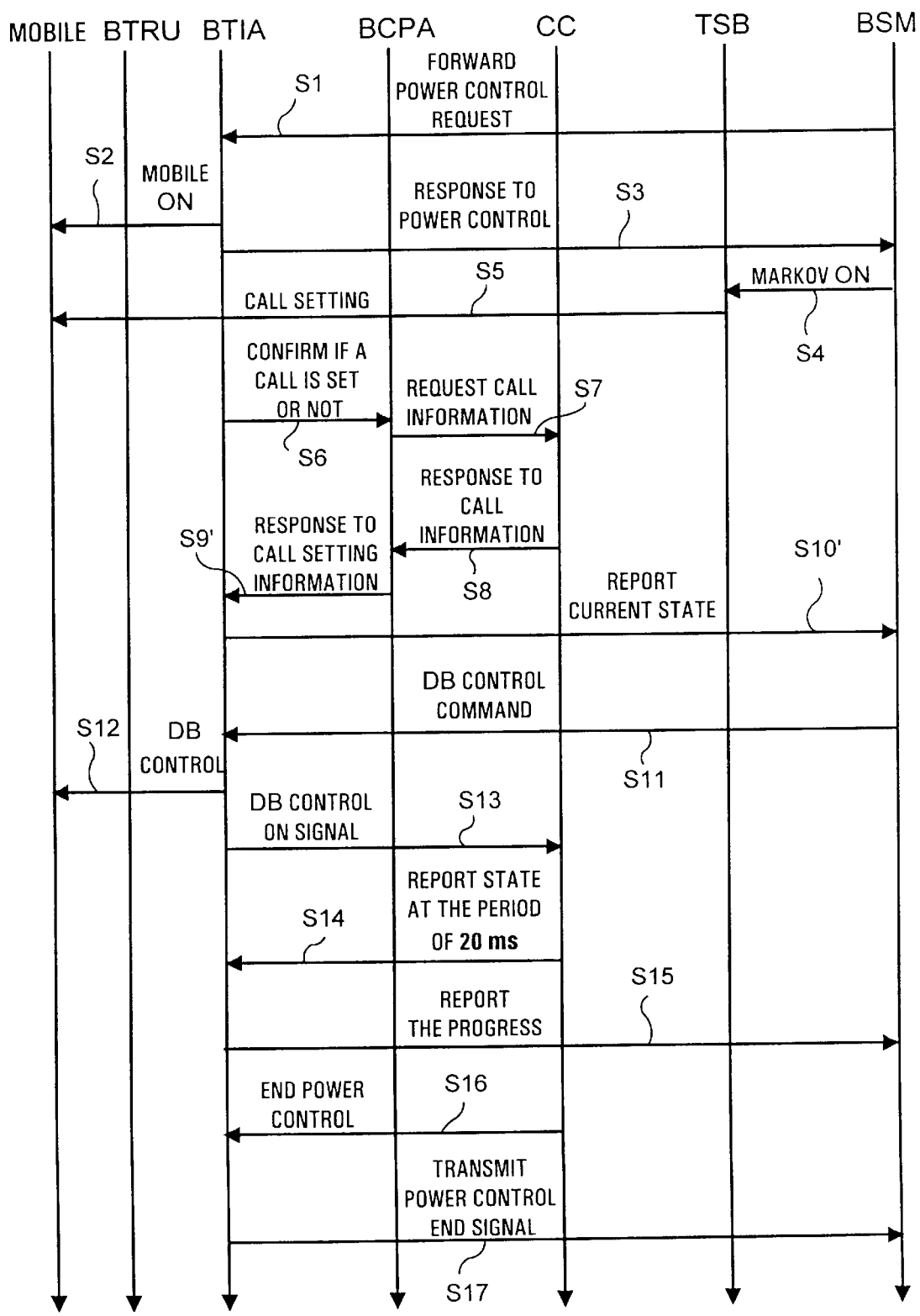
FIG. 3A is a flow diagram showing a method of controlling the forward link power according to the present invention.

FIG. 3A is a flow diagram showing a method of testing the forward link power control according to the present invention. The transmission loss between the base station and mobile depends on each mobile. Thus, the forward link power control is needed, which controls the power output of the base station to provide a signal strength sufficient to maintain signal quality appropriate for each mobile. The base station carries out the forward link power control function by controlling the assignment of the forward link power.

Referring to FIG. 3A, when base station 20 and mobile 10 are connected to each other and power is applied thereto as shown in FIG. 2A, a base station controller monitor (BSM) requests a base transceiver station test interface board assembly (BTIA) to control the forward power at step S1. The BTIA which received the forward power control request sends "mobile on" signal to MOBILE (which corresponds to mobile 10 of FIG. 2A) at step S2. Here, "mobile on" signal is input to attenuator 30 through transmission cable 41, and output from the attenuator without being attenuated because the attenuation factor of attenuator 30 is 0 at the early stage. Then, the signal is sent to mobile 10 through transmission cable 41'. Mobile 10 periodically calculates the received power and error rate, and transmits them to the BTIA. The BTIA receives the received power and error rate from mobile 10, and sends a signal responding to the power control request to the BSM at step S3.

The BSM, which received the power control request responding signal from the BTIA, outputs a "markov ON" signal to a transcoding select bank (TSB) at step S4. Then, the TSB outputs a call setting signal to mobile 10 at step S5. The BTIA receives the call setting signal from mobile 10, and outputs a signal for confirming if the call is set to a BTS main control process board assembly (BCPA) at step S6. Then, the BCPA sends a call information request signal to a channel card (CC) at step S7. The CC outputs a signal responding to the call information to the BTIA at step S8. The BCPA which received the call information responding signal outputs a signal responding to call setting information to the BTIA at step S9.

When attenuation occurs by increasing the attenuation factor of attenuator 30, the error rate of the received data is increased but the received power is decreased in mobile 10. Thus, mobile 10 calculates the received power and error rate, and transmits them to the BTIA. For example, a forward-direction CDMA channel includes a pilot channel, synchronous channel, talking channel and overhead channel, and each of the talking channel and overhead channel have seven-bit digital gain indication. The transmission power of each channel is proportional to the square of the digital gain value.

The BTIA which confirmed the call setting outputs current state information (the intensity of the power received from mobile 10, error rate of received data, attenuation factor of attenuator 30, and digital gain, etc.) to the BSM, so as to report the current state of the forward link at step S10. The BSM which received the current state from the BTIA compares the received error rate with a critical value, and then outputs a transmission power control command (DB control command) to the BTIA, based on the compared result at step S11. Then, BTIA instructs mobile 10 to control the transmission power at step S12.

The BTIA which received the reception power and error rate from mobile 10 outputs a signal for requesting the forward power control to the CC at step S13. The CC which received the forward power control request signal increases the transmission power, and reports the transmission power rising state to the BTIA at a period of 20 ms at step S14. The BTIA sends information about the progress of forward power control to the BSM at step S15. Mobile 10 includes a message, which continuously requests correction at a fixed period until the mobile can normally receive signals, into a traffic channel, and transmits the message. The BTIA and CC repeat steps S13 and S14. When the receiving state is stabilized in mobile 10, the CC informs the BTIA that the power control is completed at step S16. The BTIA which received the power control completion signal outputs a signal informing the completion of the forward power control to the BSM at step S17.

To control the power of the forward-direction talking channel of the base station, each mobile measures the quality of the forward-direction talking channel frame, and periodically sends the number of poor frame measured to the base station. The base station compares the number of poor frame received from the mobile with a critical value, and then increases or decreases the power of the forward-direction channel. When the number of poor frame exceeds a predetermined value, the mobile automatically sends the number of poor frame to the base station, and the base station raises the power assigned to the channel.

FIG. 2B is a block diagram of a hardware for testing the reverse link power control function according to the present invention. Referring to FIG. 2B, attenuator 30 is set between the transmission terminal of mobile 10 and reception terminal of base station 20 using transmission cables 51 and 51'. Attenuator 30 may be a variable attenuator whose attenuation factor is controllable. A reception cable 52 where there is no loss is connected between the transmission terminal of base station 20 and reception terminal of mobile 10. The attenuation factor of the attenuator, which is connected between the transmission terminal of base station 20 and reception terminal of mobile 10 in order to test the reverse link power control when the forward link power control is tested, is set to 0, to thereby produce a reception cable where there is no loss.

As described above, attenuator 30 is inserted between the transmission terminal of mobile 10 and reception terminal of base station 20, and a cable 51 is connected between the reception terminal of mobile 10 and transmission terminal of base station 20, to attenuate the transmission signal by attenuator 30. Thus, the attenuator and cable replace the radio transmission/reception path between the base station and mobile. Base station 20 calculates the received power and error rate of received data based on the variation in the attenuation factor of attenuator 30, compares the calculated result with a critical value, and sends a message requesting correction of the transmission power of mobile 10 to mobile 10 according to the compared result. Mobile 10 receives the transmission power correction request message, corrects the transmission power and transmits it, thereby controlling the reverse link power.

Figure 3B:
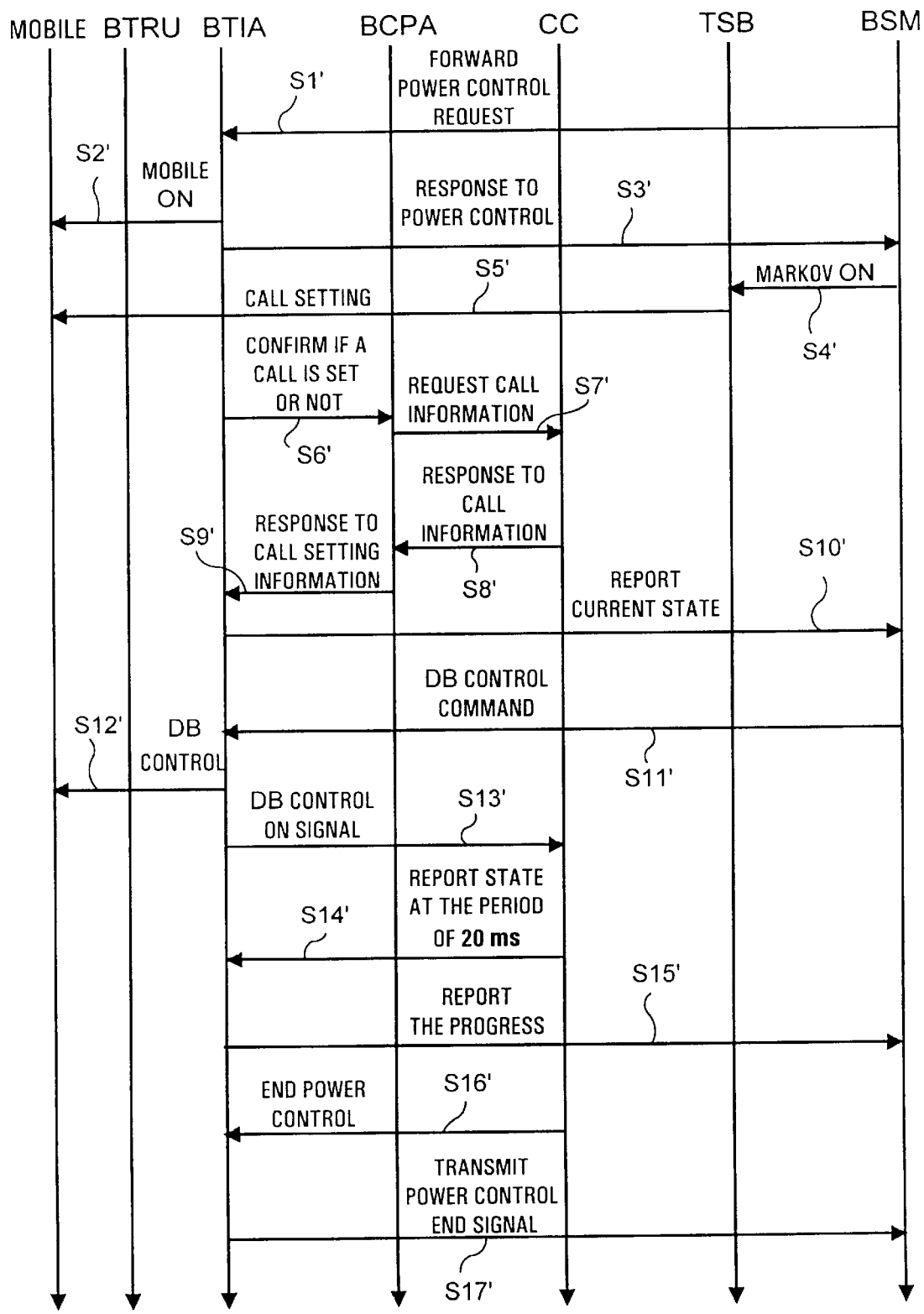
FIG. 3B is a flow diagram showing a method of controlling the reverse link power according to the present invention.

FIG. 3B is a flow diagram showing a method of testing the reverse link power control according to the present invention. The mobile cannot measure the difference between forward-direction channel and inverse-direction channel, which is resulted from mismatching of the transmitter and receiver, or different fading generated due to frequencies whose bands are different from each other. Each mobile controls its power using information data which is transmitted from the base station through the forward-direction channel at a low rate, in order to correct the unmeasurable error. The base station obtains error correction information by monitoring the state of inverse-direction channel of the mobile, compares the information with a critical value, and then requests the mobile to control the power based on the compared result.

Referring to FIG. 3B, when base station 20 and mobile 10 are connected to each other and power is applied thereto as shown in FIG. 2B, the BSM requests the BTIA to control the reverse power at step S1'. The BTIA which received the reverse power control request sends "mobile on" signal to MOBILE at step S2'. Here, this signal is applied to mobile 10 through transmission cable 52. The explanations about steps S3' to S17' performed in the reverse power control will be omitted because the steps are the same as those of the above-described forward power control.

According to the present invention, the mobile is tested on condition that the attenuator replaces the radio path between the base station and mobile. Accordingly, the test can be carried out in the laboratory, and its result is equivalent to that of the field test. Furthermore, the power control function of the mobile communications system can be easily tested in the laboratory.

It will be apparent to those skilled in the art that various modifications and variations can be made in the method and device for testing link power control in a mobile communications system of the present invention without departing from the spirit or scope of the invention. Thus, it is intended that the present invention cover the modifications and variations of this invention provided they come within the scope of the appended claims and their equivalents.

What is claimed is:

1. A method of testing a (link power control in a mobile communication system, the method comprising the steps of:
    (a) a BSM requesting a BTIA to control the forward power, and the BTIA, which received the forward power control request, sending "mobile on" signal to a mobile;
    (b) the BTIA receiving information about a reception power and error rate from the mobile and outputting a signal responding to the power control request to the BSM, and the BSM sending "markov on" signal to a TSB (Transcoding Select Bank);
    (c) the TSB outputting a call setting signal to the mobile, the BTIA receiving the call setting signal from the mobile, and outputting a signal for confirming if the call is set to a BCPA;
    (d) the BCPA outputting a signal requesting call information to a channel card, the channel card sending a signal responding the call information to the BCPA, and the BCPA outputting a signal responding to call setting information to the BTIA;
    (e) the BTIA sending the current state of the BSM to report the current state of the forward link, the BSM comparing the received error rate with a critical value and outputting a transmission power control command to the BTIA based on the compared result, and the BTIA which received the transmission power control command instructing the mobile to control its transmission power;
    (f) the BTIA , which received the information about the reception power and error rate from the mobile, outputting a signal requesting the forward power control to the channel card, and the channel card raising the transmission power and reporting the transmission power rising state to the BTIA at a predetermined period;

(g) the BTIA, which received the transmission power rising state from the channel card, sending information about the progress of the forward power control to the BSM, the mobile including a message continuously requesting correction at a predetermined period into a traffic channel until it can normally receive signals, and transmitting the message, and the BTIA and channel card repeating the step (f); and the channel card informing the BTIA that the power control is finished when the receiving state of the mobile is stabilized, and the BTIA outputting a signal informing the completion of the forward power control to the BSM.

2. The method as claimed in claim 1, wherein the channel card raises the transmission power at a period of 20 ms.

3. The method as claimed in claim 1, wherein a transmission/reception cable and attenuator are connected to the mobile and BTIA, to attenuate a transmission/reception signal.

4. A method of testing a link power control in a mobile communication system, the method comprising the steps of:

(a) a BSM requesting a BTIA to control the reverse power, and the BTIA, which received the reverse power control request, sending "mobile on" signal to a mobile;

(b) the BTIA receiving information about a transmission power and error rate from the mobile and outputting a signal responding to the power control request to the BSM, and the BSM sending "markov on" signal to a TSB(Transcoding Select Bank);

(c) the TSB outputting a call setting signal to the mobile, the BTIA receiving the call setting signal from the mobile, and outputting a signal for confirming if the call is set to a BCPA;

(d) the BCPA outputting a signal requesting call information to a channel card, the channel card sending a signal responding the call information to the BCPA, and the BCPA outputting a signal responding to call setting information to the BTIA, (e) the BTIA sending the current state of the BSM to report the current state of the reverse link, the BSM comparing the received error rate with a critical value and outputting a transmission power control command to the BTIA based on the compared result, and the BTIA which received the transmission power control command instructing the mobile to control its transmission power;

(f) the BTIA, which received the information about the transmission power and error rate from the mobile, outputting a signal requesting the reverse power control to the channel card, and the channel card raising the transmission power and reporting the transmission power rising state to the BTIA at a predetermined period, (g) the BTIA, which received the transmission power rising state from the channel card, sending information about the progress of the reverse power control to the BSM, the mobile including a message continuously requesting correction at a predetermined period into a traffic channel until it can normally receive signals, and transmitting the message, and the BTIA and channel card repeating the step (f); and (h) the channel card informing the BTIA that the power control is finished when the transmitting state of the mobile is stabilized, and the BTIA outputting a signal informing the completion of the reverse power control to the BSM.

* * * * *